July 20, 1937.    F. NALLINGER    2,087,543
SPRINGING FOR VEHICLES
Filed Sept. 6, 1934

Inventor

Patented July 20, 1937

2,087,543

UNITED STATES PATENT OFFICE 2,087,543

SPRINGING FOR VEHICLES

Fritz Nallinger, Stuttgart, Germany, assignor to Daimler Benz Aktiengesellschaft, Stuttgart-Untertürkheim, Germany Application September 6, 1934, Serial No. 742,992
In Germany September 9, 1933

7 Claims. (Cl. 267—19)

The invention relates to a connection of swinging wheel supporting members such as leaf springs or links with relatively sprung parts, especially with the wheel carriers of independently sprung front wheels of power-driven vehicles. The invention consists essentially in this that between the swinging wheel supporting member and the sprung part, for instance the wheel carrier, there is provided a joint which allows a small lateral displacement between the corresponding parts. A main object of the invention is to avoid the so-called shimmy of the front wheels.

In a preferable constructional example, rubber buffers are provided on the connecting bolt between the eyes of a transverse leaf spring or link and the eyes of a steering swivel joint, whereby the buffers allow a small yielding displacement of the jointed parts against another in the direction of travel. Only one of the two front wheels may be provided with rubber buffers interposed in the joints. It is also possible to connect only one of two superposed leaf springs with the axle carrier by yielding joints according to the invention.

The invention may be employed also for common rigid axles which are for instance sprung by a transverse leaf spring.

In the accompanying drawing a constructional example is illustrated, whereby

Figure 1:
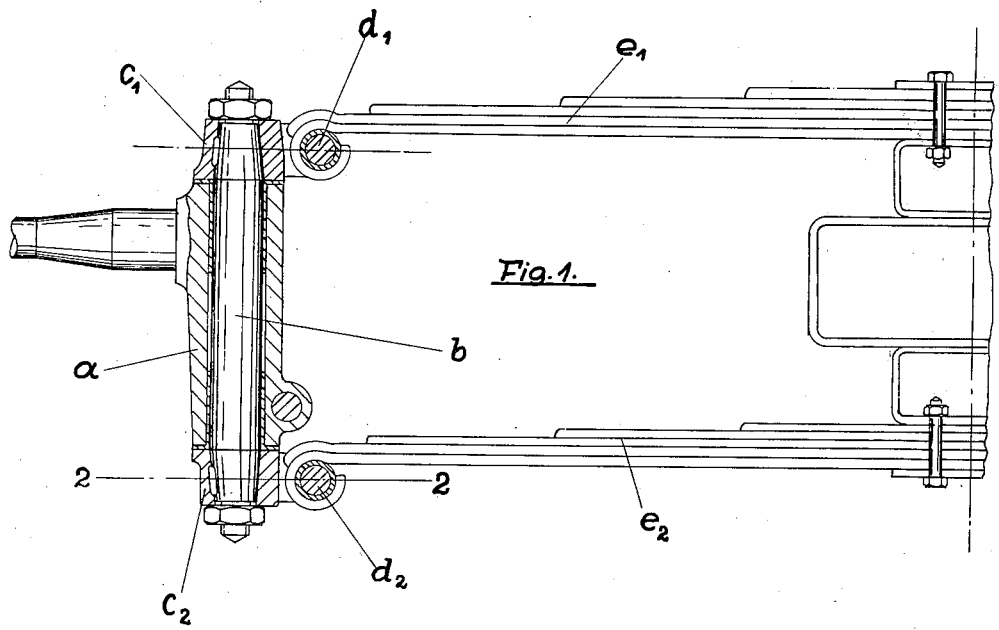
Figure 1 is a side elevation of the springing arrangement.
Figure 2:
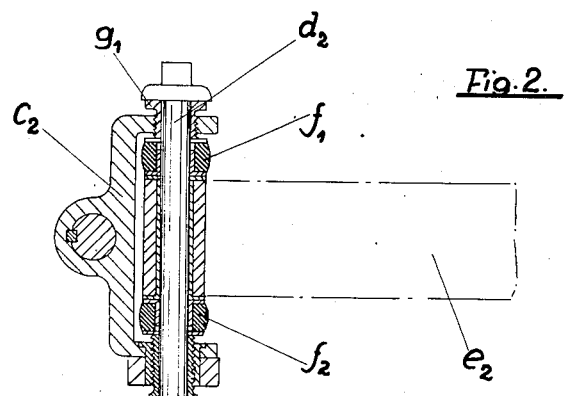
Figure 2 is a section on line A—A of Fig. 1.

Referring to Figures 1 and 2, $a$ is a wheel carrier, $b$ a steering swivel, which is joined to the two leaf springs $e_1$ and $e_2$ superposed one above the other by means of the forked joint-pieces $c_1$ and $c_2$ and spring bolts $d_1$ and $d_2$.

As shown in Figure 2, rubber buffers $f_1$, $f_2$ are provided between the eyes of the leaf springs $e_1$ and the forked ends of the joint piece $c_1$. The buffers can be put under compression by means of nuts $g_1$ and $g_2$. In this manner, a small displacement of the leaf spring relatively to the joint piece $c_1$ or the axle carrier $a$ is allowed on the spring bolt $d_1$ against the pressure of the rubber buffers.

Also the connection of the lower spring $e_2$ and the joint piece $c_2$ may be provided in a similar manner. However eventually only one of the two joints may yield. Furthermore, each joint may include only one of the two buffers $f_1$ or $f_2$, especially that buffer which has to absorb jolts striking the wheel from the direction of travel. Furthermore a similar yielding connection may be employed with the other front wheel in such a manner that all four joints of the two wheels or only some of these joints are provided with yielding means.

The yielding connection is also applicable for rigid links which are sprung by any suitable means, for instance helical springs or the like.

Figure 3:
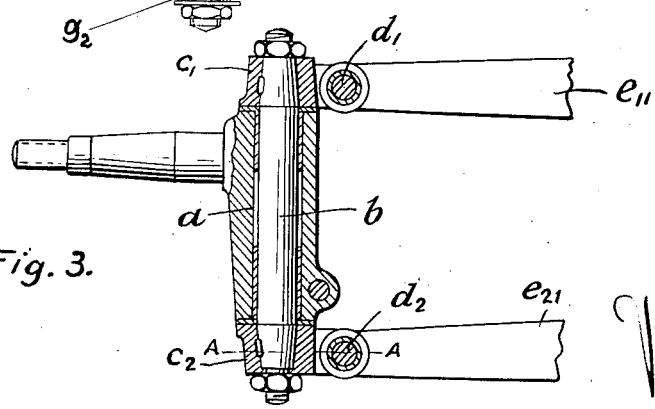
Figure 3 is a side elevation of a modification.

Figure 3 shows a construction in which the yielding connection is applied to a superposed link structure. In this figure, the wheel carrier $a$ in which the steering swivel $b$ is housed is connected to a pair of superposed links $e_{11}$ and $e_{21}$ by means of two forked joint pieces $c_1$ and $c_2$ and bolts $d_1$ and $d_2$.

I claim:

1. A springing arrangement for vehicles, comprising a frame, a wheel, a wheel carrier, means for independently guiding the wheel, comprising a swinging wheel supporting member connected to the frame and swinging in a vertical transverse plane, a joint for connecting the swinging wheel supporting member to the wheel carrier, said joint allowing free rotary motion between the wheel carrier and the swinging wheel supporting member and movement of the wheel carrier relatively to the swinging wheel supporting member in the direction of travel of the vehicle but not motion in a direction perpendicular to the axis of said rotary motion, and yielding means interposed between the wheel carrier and the swinging wheel supporting member for elastically limiting the relative motion in the direction of travel of the vehicle.

2. A springing arrangement for vehicles, comprising a frame, a wheel, a wheel carrier, means for independently guiding the wheel, comprising a swinging wheel supporting member connected to the frame and swinging in a vertical transverse plane, a pivot bolt for connecting the swinging wheel supporting member to the wheel carrier, said bolt arranged to extend perpendicularly to the swinging plane of said wheel supporting member and allowing free rotary motion between the wheel carrier and the swinging wheel supporting member but not motion in a direction perpendicular to the axis of the bolt, and a rubber buffer interposed between the wheel carrier and the swinging wheel supporting member for elastically limiting motion of the wheel carrier relatively to the swinging wheel supporting member in the direction of travel of the vehicle.

3. A springing arrangement for vehicles, comprising a frame, a wheel, a wheel carrier, two superposed wheel supporting members for independently guiding the wheel connected to the frame and swinging in a vertical transverse plane, two joints for connecting the swinging wheel supporting members to the wheel carrier, said joints allowing free rotary motion between the wheel carrier and the swinging wheel supporting members and movement of the wheel carrier relatively to the swinging wheel supporting members in the direction of travel of the vehicle but not motion in a direction perpendicular to the axis of said rotary motion, and yielding means interposed between the wheel carrier and the swinging wheel supporting members for elastically limiting the relative motion in the direction of travel of the vehicle.

4. A springing arrangement for vehicles, comprising a frame, a wheel carrier, two superposed wheel supporting members for independently guiding the wheel connected to the frame and swinging in a vertical transverse plane, two pivot bolts for connecting the swinging wheel supporting members to the wheel carrier, said bolts arranged to extend perpendicularly to the swinging plane of said swinging wheel supporting members in the direction of travel of the vehicle and allowing free rotary motion between the wheel carrier and the swinging wheel supporting members but not motion in a direction perpendicular to the axes of the bolts, and rubber buffers interposed between the wheel carrier and the swinging wheel supporting members for elastically limiting motion of the wheel carrier relatively to the swinging wheel supporting members in the direction of travel of the vehicle.

5. A springing arrangement for vehicles, comprising a frame, a wheel, a wheel carrier, two superposed wheel supporting members for independently guiding the wheel connected to the frame and swinging in a vertical transverse plane, two joints for connecting the swinging wheel supporting members to the wheel carrier, said joints allowing free rotary motion between the wheel carrier and the swinging wheel supporting members and movement of the wheel carrier relatively to the swinging wheel supporting members in the direction of travel of the vehicle but not motion in a direction perpendicular to the axis of said rotary motion, and yielding means interposed between the wheel carrier and one of the swinging wheel supporting members for elastically limiting the relative motion in the direction of travel of the vehicle.

6. A springing arrangement for vehicles, comprising a frame, a wheel, a wheel carrier, two superposed wheel supporting members for independently guiding the wheel connected to the frame and swinging in a vertical transverse plane, two joints for connecting the swinging wheel supporting members to the wheel carrier, said joints allowing free rotary motion between the wheel carrier and the swinging wheel supporting members and movement of the wheel carrier relatively to the swinging wheel supporting members in the direction of travel of the vehicle but not motion in a direction perpendicular to the axis of said rotary motion, at least one of said joints comprising a bolt arranged to extend perpendicularly to the swinging plane of said wheel supporting members, and a rubber buffer on said bolt interposed between the wheel carrier and the swinging wheel supporting member for elastically limiting the relative motion in the direction of travel of the vehicle.

7. A springing arrangement for vehicles, comprising a frame, a supporting wheel, a wheel carrier, a steering swivel in said wheel carrier, two superposed transverse leaf springs fastened to the frame, two joint pieces on the steering swivel, a pivot bolt on each joint piece for connecting said joint piece with one of said leaf springs, said pivot bolt arranged so as to extend in a direction perpendicular to the swinging plane of the transverse leaf springs and allowing free rotary motion between the joint piece and the transverse leaf spring but not motion in a direction perpendicular to the axis of the bolt, and rubber buffers on the bolts interposed between the joint pieces and the transverse leaf springs for elastically limiting the motion of the wheel carrier relatively to the leaf springs in the direction of travel of the vehicle.

FRITZ NALLINGER.